July 5, 1966 I. R. MARCUS ET AL 3,259,854
RESISTANCE-CAPACITANCE TIMING CIRCUIT FOR LONG INTERVALS
Filed Jan. 23, 1964
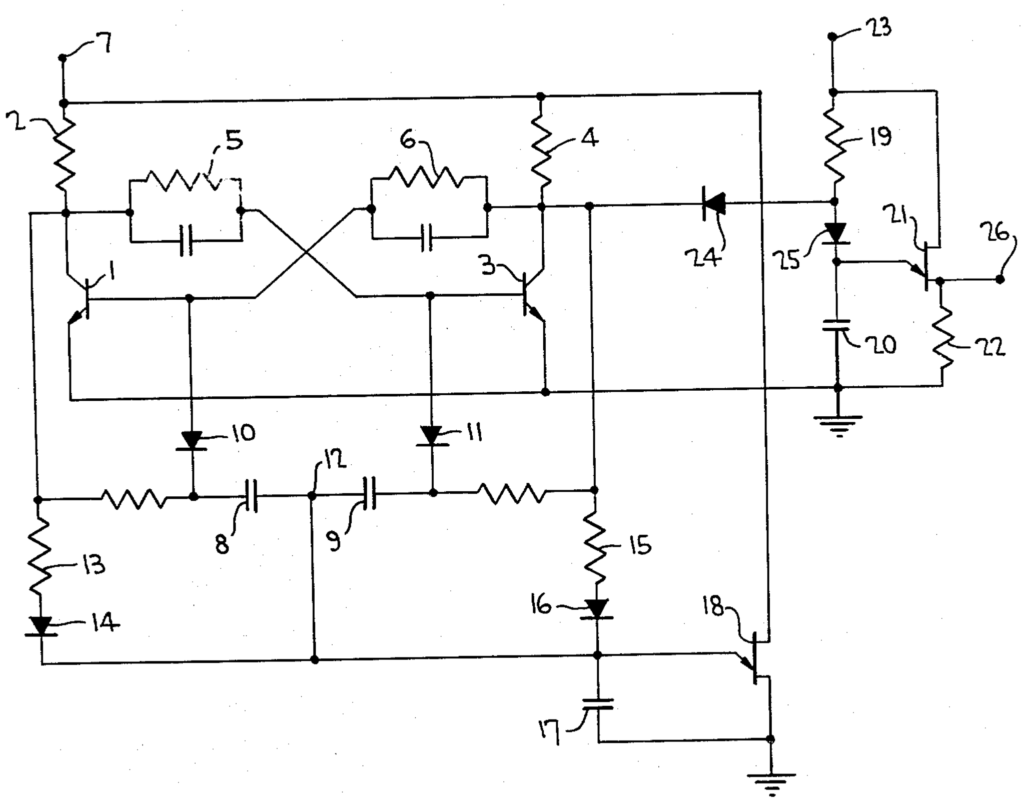
INVENTORS,
IRA R. MARCUS
RONALD J. REYZER
BY: Harry M. Saragovitz, Edward J. Kelly, Herbert Berl & J. P. Edgerton United States Patent Office 3,259,854

Patented July 5, 1966

3,259,854

RESISTANCE-CAPACITANCE TIMING CIRCUIT FOR LONG INTERVALS

Ira R. Marcus, Silver Spring, Md., and Ronald J. Reyzer, Washington, D.C., assignors to the United States of America as represented by the Secretary of the Army Filed Jan. 23, 1964, Ser. No. 339,833
3 Claims. (Cl. 331—111)

The invention described herein may be manufactured and used by or for the Government of the United States of America for governmental purposes without the payment to us of any royalty thereon.

This invention relates generally to relaxation oscillator circuits, and more particularly to an improved relaxation oscillator circuit wherein the effective RC time constant which determines the period of oscillation of the relaxation oscillator is many times greater than the actual RC time constant of the current limiting resistor and the charging capacitor.

Relaxation oscillators find many applications where stable low-frequency sources are required such as, for example, in establishing time intervals of long periods. In the prior art, relaxation oscillator circuits have a period of oscillation determined by the RC time constant. As a result, for long periods large values of resistance and capacitance are required. This means components of large physical size and decreased temperature stability. This is a considerable disadvantage when the requirements of the oscillator are that it have a long period of oscillation, that it be packaged in a small volume, and that its frequency be relatively independent of temperature.

It is therefore an object of the invention to provide a relaxation oscillator circuit which has a period of oscillation greater than the actual RC time constant of the circuit.

It is another object of the present invention to provide a relaxation oscillator circuit which employs components of small physical size and yet has a long period of oscillation.

It is yet another object of the instant invention to provide a relaxation oscillator circuit which is relatively independent of temperature.

It is still another object of this invention to provide a relaxation oscillator circuit which is substantially independent of variations in supply voltage.

According to the present invention, the foregoing and other objects are attained by providing a gating circuit in combination with a bistable multivibrator which is symmetrically triggered by a first RC relaxation circuit to establish a pulse train having a constant volt-sec. area for a given arbitrary time interval which is greater than the period of the pulse train and a second RC relaxation circuit in which the capacitor is charged by the pulse train.

The specific nature of the invention, as well as other objects, aspects, uses and advantages thereof, will clearly appear from the following description and from the accompanying drawing, in which the sole figure is a schematic diagram of the preferred embodiment of the present invention.

Referring now to the drawing wherein there is shown a bistable multivibrator of standard design which comprises a first transistor 1, a first load resistor 2 connected to the collector of transistor 1, a second transistor 3, a second load resistor 4 connected to the collector of transistor 3, and cross coupling networks 5 and 6 connected between the collector of transistor 1 and the base of transistor 3 and between the collector of transistor 3 and the base of transistor 1, respectively. The bistable multivibrator is powered from a source (not shown) which is connected to terminal 7. The bistable multivibrator is triggered symmetrically in a conventional manner by coupling capacitors 8 and 9 and steering diodes 10 and 11. For example, consider transistor 1 to be conducting and transistor 3 to be non-conducting. Under this condition, the base of transistor 1 is at a positive potential and the base of transistor 3 is at zero or ground potential. Now if a negative going pulse appears at junction 12, steering diode 10 conducts but steering diode 11 does not. The base of transistor 1 therefore goes to ground potential causing transistor 1 to become non-conducting. The collector of transistor 1 assumes a high positive potential which causes the base of transistor 3 to assume a positive potential. This causes transistor 3 to conduct which lowers the collector of transistor 3 to ground potential. The base of transistor 1, therefore, goes to ground potential thereby maintaining transistor 1 non-conductive.

The trigger pulse at junction 12 is produced by an RC relaxation circuit which comprises a first current limiting resistance 13 connected in series with a first isolation diode 14, a second current limiting resistance 15 connected in series with a second isolation diode 16, a charging capacitor 17 having one terminal connected to the cathodes of isolation diodes 14 and 16 and to junction 12, and a unijunction transistor 18 having its emitter electrode connected to junction 12 and one base electrode connected to the other terminal of capacitor 17. When transistor 1 is conducting resistor 13 is shorted substantially to ground potential. Capacitor 17 then charges through resistor 15. When transistor 3 is conducting resistor 15 is shorted substantially to ground potential. Capacitor 17 then charges through resistor 13. When capacitor 17 has charged to a voltage which is equal to the firing voltage of unijunction transistor 18, transistor 18 conducts thereby substantially discharging capacitor 17. The discharge of capacitor 17 produces a negative going voltage pulse at junction 12. The values of the resistances of resistor 13 and of resistor 15 determine the frequency of the trigger pulses at junction 12. If the resistors 13 and 15 are of unequal values, the times of conduction of transistors 1 and 3 are unequal.

From what has been said above skilled persons will readily understand that the output to junction 12 is a series of pulses the leading edges of which are time-spaced from each other alternately by a first uniform time interval $t_1$ and a second uniform time interval $t_2$, the ratio of $t_1$ to $t_2$ being determined by the ratio of (1) the value of the resistive path from source 7 through diode 14 to capacitor 17 when diode 14 is conducting to (2) the value of the resistive path from source 7 through diode 16 to capacitor 17 when diode 16 is conducting.

The output of the bistable multivibrator is used to gate a second RC relaxation circuit which comprises a current limiting resistor 19, a charging capacitor 20 connected in series with resistor 19, and a unijunction transistor 21 having its emitter electrode connected to one terminal of the capacitor 20 and one base electrode connected to the other terminal of capacitor 20 through a load resistor 22. Current limiting resistor 19 is connected to a source of voltage (not shown) by way of terminal 23. This source of voltage is preferably separate from the source of voltage connected to terminal 7 and may be regulated. Interposed between current limiting resistor 19 and charging capacitor 20 are gating diodes 24 and 25. When transistor 3 is conducting, diode 24 is forward biased and conducts. Under this condition, diode 25 is back biased by the voltage due to the charge that has accumulated on capacitor 20 and does not conduct. When transistor 3 is not conducting, diode 24 is back biased by the high positive potential at the collector of transistor 3 and diode 24 does not conduct. Under this condition, diode 25 is forward biased and conducts. Thus, it can be seen charging capacitor 20 charges through current limiting resistor 19 only when transistor 3 is not conducting. When the voltage across charging capacitor 20 reaches the firing voltage of unijunction transistor 21, transistor 21 conducts discharging capacitor 20 through load resistor 22. The voltage pulse developed across resistor 22 during the discharge appears at output terminal 26.

Consider the time that transistor 3 is not conducting as $t_1$ and the time that transistor 3 is conducting as $t_2$. Capacitor 20 charges during the time intervals $t_1$ and holds the charge accumulated during previous time intervals $t_1$ during time intervals $t_2$. The time constant of current limiting resistor 19 and charging capacitor 20 is, therefore, effectively multiplied by the factor $$\frac{t_1+t_2}{t_1}$$

More precisely, the period of oscillation of the relaxation oscillator is expressed as follows:

$$p=\frac{t_1+t_2}{t_1}R_{19}C_{20}\ln\frac{V-V_q}{V-V_f}$$

where $p$ is the period in seconds, $R_{19}$ is the resistance of resistor 19 in ohms, $C_{20}$ is the capacitance of capacitor 20 in farads, V is the voltage at terminal 23, $V_q$ is the voltage remaining on capacitor 20 just after transistor 21 has ceased to conduct, and $V_f$ is the firing voltage of transistor 21. The time $t_1$ during which transistor 3 is not conducting is determined by the RC time constant of resistor 15 and capacitor 17. Similarly, the time $t_2$ during which transistor 3 is conducting is determined by the RC time constant of resistor 13 and capacitor 17. The expression for the period of oscillation therefore becomes:

$$p=\frac{R_{15}+R_{13}}{R_{15}}R_{19}C_{20}\ln\frac{V-V_q}{V-V_f}$$

The period of oscillation is increased by making $R_{13}$ greater than $R_{15}$. Thus, the period may be made much greater than the RC time constant of resistor 19 and capacitor 20 thereby allowing the use of smaller more temperature stable components.

An important feature of this invention is that the frequency of the gating pulses is not critical and may vary due to varying voltage at terminal 7 and other influences. It is only important that the ratio $$\frac{R_{15}+R_{13}}{R_{15}}$$

remain constant. This ratio is made substantially independent of variations in ambient temperature by using temperature compensated resistors for $R_{13}$ and $R_{15}$ or by choosing resistors having temperature coefficients such that the ratio remains constant.

It will be apparent that the embodiment shown is only exemplary and that various modifications can be made in construction and arrangement within the scope of the invention as defined in the appended claims.

We claim as our invention:

1. A relaxation oscillator comprising:

(a) a relaxation circuit including—
  (1) a charging capacitor,
  (2) a source of constant fixed voltage,
  (3) a current-limiting resistor,
  (4) a gating device having an input junction for receiving a series of gating pulses,
  (5) said gating device and said current-limiting resistor being connected in series between said source and said capacitor,
  (6) said gating device being adapted to allow the flow of current into said capacitor during the presence of a gating pulse and to stop the flow of current to said capacitor in the absence of a gating pulse; and (b) a gating-pulse generator for producing a series of gating pulses having a uniform duration $t_1$ and a uniform repetition rate $t_1+t_2$, the output of said generator being connected to said input junction of said gating device, said generator including—
  (1) a bistable device having an output terminal and a triggering junction, said output terminal being connected to the input junction of said gating device, said bistable device being adapted to switch between a first stable state characterized by the presence of a pulse at said output terminal and a second stable state characterized by the absence of a pulse at said output terminal, said bistable device being adapted to switch from one of said states to the other of said states each time a triggering pulse is received at said triggering junction, and
  (2) triggering means, having its output connected to said triggering junction, for producing a series of triggering pulses the leading edges of which are time-spaced from each other alternately by a first uniform time interval equal to $t_1$ and a second uniform time interval equal to $t_2$.

(c) whereby the time constant of said relaxation circuit is effectively multiplied by a factor equal to the ratio of $t_1$ plus $t_2$ to $t_1$.

2. The relaxation oscillator defined in claim 1 wherein said triggering means includes a first resistive path the value of which determines said first time interval and a second resistive path the value of which determines said second time interval.

3. The invention according to claim 1, said triggering means comprising:

(a) a second charging capacitor,
(b) a second source of constant fixed voltage,
(c) a first resistive path having one end connected to said second source of voltage,
(d) a second resistive path having one end connected to said second source of voltage,
(e) means responsive to the state of said bistable device for charging said second charging capacitor from said second source of voltage through only said first resistive path when said bistable device is in one of its two states and through only said second resistive path when said bistable device is in the other of its two states,
(f) means connected to said second charging capacitor for sensing the voltage across said second charging capacitor and for discharging said second charging capacitor when the voltage across said second charging capacitor reaches a predetermined value, and
(g) means connected between said second charging capacitor and said triggering junction for applying triggering pulses to said bistable device,
(h) whereby the relative values of $t_1$ and $t_2$, and thus the factor by which the time constant of the relaxation circuit is effectively multiplied, are determined by the relative values of said first and second resistive paths.

References Cited by the Examiner

UNITED STATES PATENTS

| | | | |
|---|---|---|---|
| 2,997,665 | 8/1961 | Sylvan | 328—181 X |
| 3,007,055 | 10/1961 | Herzfeld | 328—185 X |
| 3,122,652 | 2/1964 | Kobbe et al. | 331—111 X |
| 3,158,757 | 11/1964 | Rywak | 328—186 X |

OTHER REFERENCES

Greenberg: "Pulse Operated Time Delay Relay," RCA Technical Notes, RCA TN No. 409, January 1961.

ROY LAKE, *Primary Examiner.*

J. B. MULLINS, *Assistant Examiner.*